June 4, 1963 W. M. HAMMOND, JR 3,091,869
GUIDED MISSILE TRAINING AND SIMULATION DEVICE
Filed March 29, 1961 4 Sheets-Sheet 1

INVENTOR.
WARDLAW M. HAMMOND, JR.
BY Julian C. Renfro

June 4, 1963   W. M. HAMMOND, JR   3,091,869
GUIDED MISSILE TRAINING AND SIMULATION DEVICE
Filed March 29, 1961   4 Sheets-Sheet 3

INVENTOR.
WARDLAW M. HAMMOND, JR.
BY
Julian C. Renfro

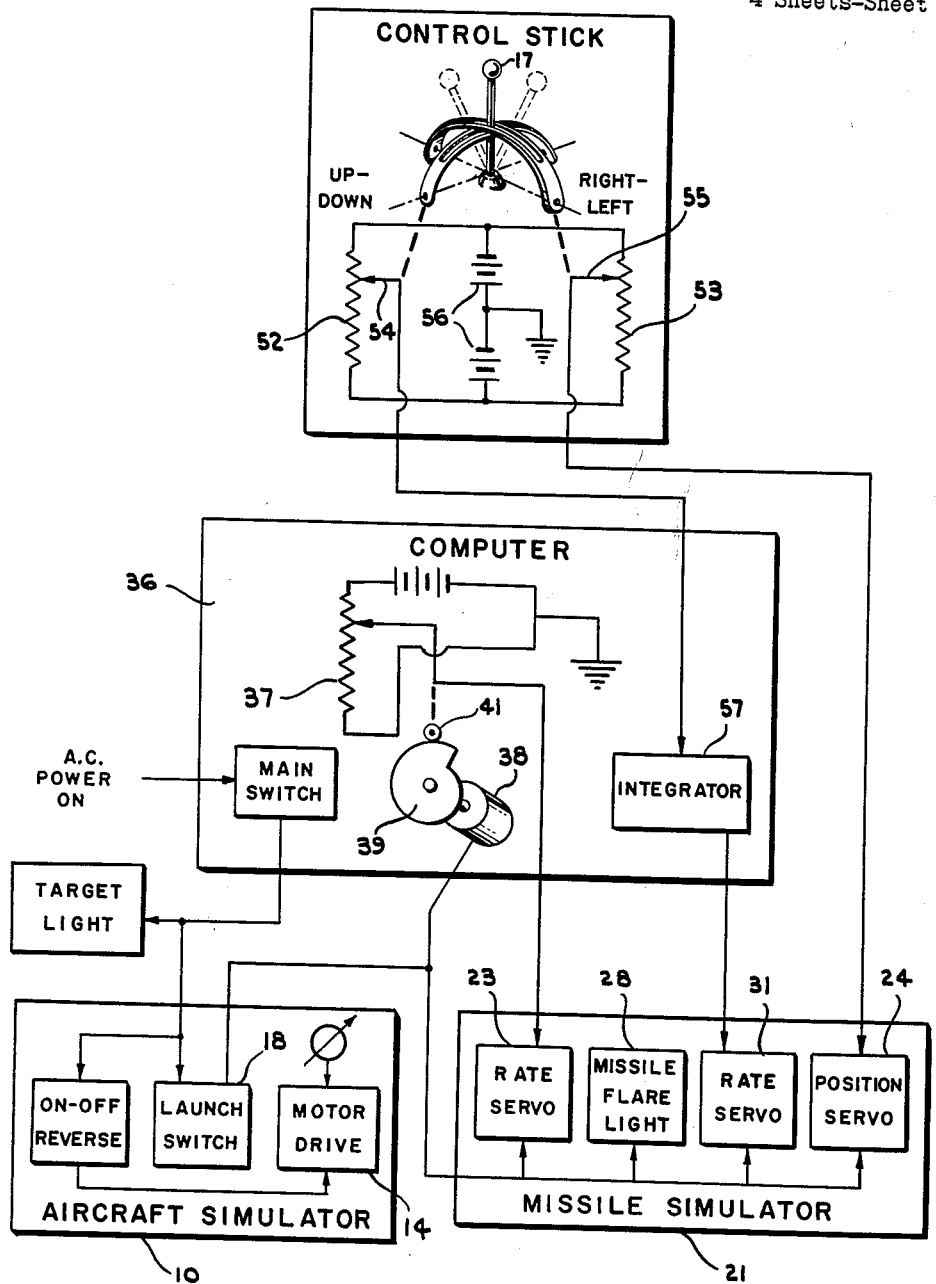

United States Patent Office 3,091,869
Patented June 4, 1963

3,091,869
GUIDED MISSILE TRAINING AND SIMULATION DEVICE
Wardlaw M. Hammond, Jr., Winter Park, Fla., assignor to Martin-Marietta Corporation, a corporation of Maryland
Filed Mar. 29, 1961, Ser. No. 99,200
10 Claims. (Cl. 35—25)

This invention relates to a device which will provide operator training experience for a missile guidance system as well as simulation of the missile guidance system for evaluation purposes.

The development and ulitization of a missile system frequently involves the use of a missile system simulator. Such a simulator can materially contribute to the design and evaluation of the system by making it possible to study the effects of various design parameters without requiring construction of the actual missile system. Thus the parameters may be varied and optimized in a manner which is obviously more economical than studying a full scale system. A missile system simulator is also valuable to raise the skill level of operators by providing practice under simulated operating conditions.

Simulators are especially important when designing a system which involves human control to a large extent, such as is required in the launching of a direct view command air to surface missile. Systems of this type have extensive dependence upon human control, and the design of the system must be adaptable to the various senses and motor functions of the human operator. The flexibility which can be achieved in a missile system simulator makes possible efficient tailoring of the system to the human requirements. A missile system simulator can also be used to determine the overall effectiveness of a particular design to determine if the basic goals or tactical requirements can be achieved.

It is obvious that the degree that the above functions can be met will depend upon the realism of the simulation. The greater the realism, usually the greater the complexity and cost. A principal consideration in the design of simulators is, therefore, achieving a suitable compromise between realism or accuracy and cost. To this end, it is necessary to keep equipment design as simplified as possible.

This invention teaches a novel approach which permits simulation of a missile guidance system with a high degree of realism and accuracy with simplified apparatus, and utilizes a three dimensional direct analogue type of apparatus wherein realism is maintained through a true perspective display of missile and target. True perspective is maintained by providing three degrees of freedom for the missile and at least one degree of freedom for the aircraft. A direct analogue type of solution of missile kinematics is achieved through the use of apparatus which accepts missile steering signals and then moves to an appropriate spatial position as prescribed by the steering command.

Prior art devices used to perform the functions of this invention may be classed as two dimensional display simulators. They consist of a computer, a cathode ray tube, and an input device. This type of system has the following limitations not found in the instant device:

(a) Large line of sight angular deviations cannot be displayed. Angles of 30°–40° are considered excessively large for this type of display, and attacks against targets 90° from launch direction cannot be simulated.
(b) The eye is brought to focus on a plane and the illusion of changing range is lost.
(c) The size of the spot representing the missile is usually fixed, thus also limiting the illusion of changing range.
(d) The computer must solve the entire equation of motion describing the dynamics and kinematics of the missile.

In the instant device there is no limit to the angular deviation of the line of sight in azimuth and it is limited to something less than 90° in elevation. According to the present invention, an aircraft simulator in the form of a wheeled vehicle is used, with the missile operator being seated thereon. The aircraft simulator is suitably equipped with missile launch and guidance controls and means to enable its speed over a surface, such as an even floor, to be controlled. Somewhat along the same line, a missile simulator in the form of a 3-wheel steerable vehicle is employed to simulate the ground track of the missile, and upon this vehicle is mounted a vertically traveling point of light source which simulates the missile flare and indicates missile position. A fixed target is mounted on the same surface upon which travel the aircraft simulator and the missile simulator, and the target may contain an impact registering device as well as an illuminating means.

Located upon the aircraft simulator is a computer which receives inputs from the missile launch switch and missile guidance control, the outputs from which are fed to the missile simulator. These inputs comprise missile ground track velocity, missile aerodynamic control surface position, and missile gravity vector or vertical velocity. A complete computer solves the equation of motion of the missile and contains a program describing the dynamics of the missile for a given flight condition, this being in accordance with standard analogue computer practice when a computer is used to simulate missile flight.

The human operator, otherwise known as a missile controller, is seated upon the aircraft simulator, and commences operation by starting the aircraft simulator and computer, and subsequently depressing the launch switch.

The simulated missile flare on the missile simulator continuously represents the spatial position of the missile depicted by said simulator, and by appropriate manipulation of the missile control means or control stick on the aircraft simulator, the operator can direct the flare along his sight line into impact with the target, this movement resulting from the selective operation of servomechanism means responsible for directing the path of the missile simulator along the floor or surface, as well as the operation of other servo means for controlling the vertical position of said flare. The missile is directed in this manner and maintained by the pilot so as to "fall" along the line of sight from the pilot to the target. At the beginning of a simulated missile launching, the missile simulator is placed next to the aircraft simulator and oriented so as to travel parallel to the track made by the aircraft simulator. The fixed target may be located on the operating surface anywhere within view of the operator.

The computer required for the invention herein disclosed need only solve for part of the missile equation of motion in the vertical plane only. Missile dynamics can be roughly duplicated by the response of the steering mechanism in the missile simulator and need not necessarily be computer derived. Direct solution of missile kinematics is supplied by the action of the 3-wheel missile simulator in the ground plane. Since the inputs to the missile simulator from the computer are vertical velocity, ground track velocity, and steering commands, several computer functions are eliminated. It can be shown that by use of the instant device, one lag network and three integrators are eliminated from that required by devices representative of current practice as described below.

The present invention presents considerable advantages over an alternate prior art approach for obtaining a three dimensional illusion. This other approach utilizes a three dimensional "bug" positioned by mechanical followers, which in this case, would have to travel over the entire distance of the display. To duplicate the travel of the invention described herein, up to twelve feet of travel would be required in the horizontal and five feet in the vertical. The mechanical support for the carriages would then occupy a volume of 720 cubic feet, and would have a weight commensurately high.

In such a large mechanism, backlash would have to be kept to a small percentage of total travel of the carriage to be consistent with the accuracy repeatability of the system. If a scoring accuracy of 3 milliradians is required, then system errors should be a small part of this value or approximately .5 mil. For a twelve-foot carriage travel, this would be equivalent to one part in 2000, or approximately 1/16 inch, and would require very precise care in mechanical design and construction. In the instant device, backlash does not enter into the ground track positioning accuracy, since the missile simulator integrates the velocity term directly by friction contact with the ground, and high accuracy is insured.

These and other objects, features and advantages of this invention will be apparent from a study of the drawings in which.

Figure 3:
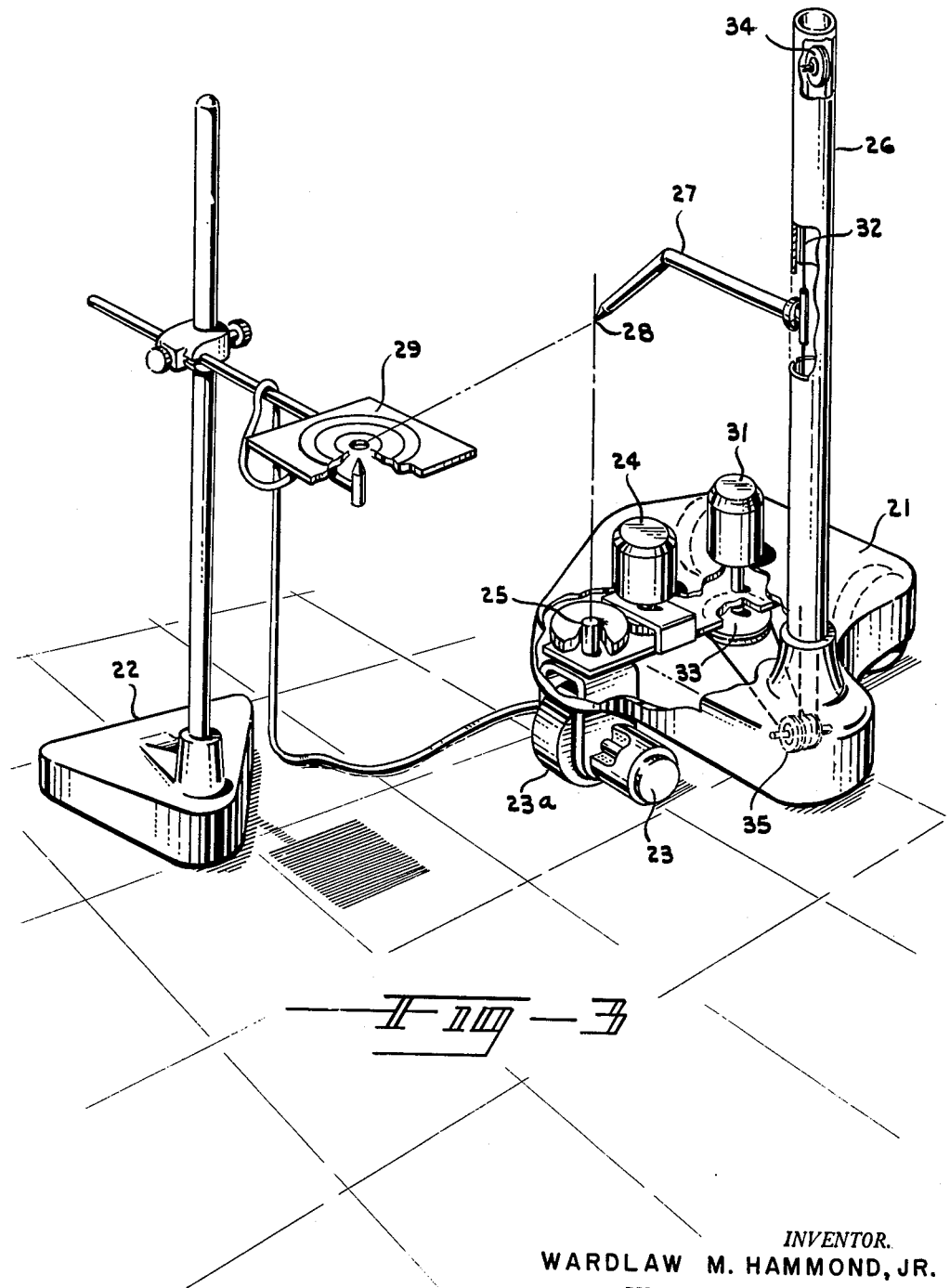

FIGURE 3 more fully illustrates certain important details of the missile simulator and its relationship to the target as the simulator approaches same; and FIGURE 4 is a simplified electrical diagram of the control system of the present training and simulation devices.

Figure 1:
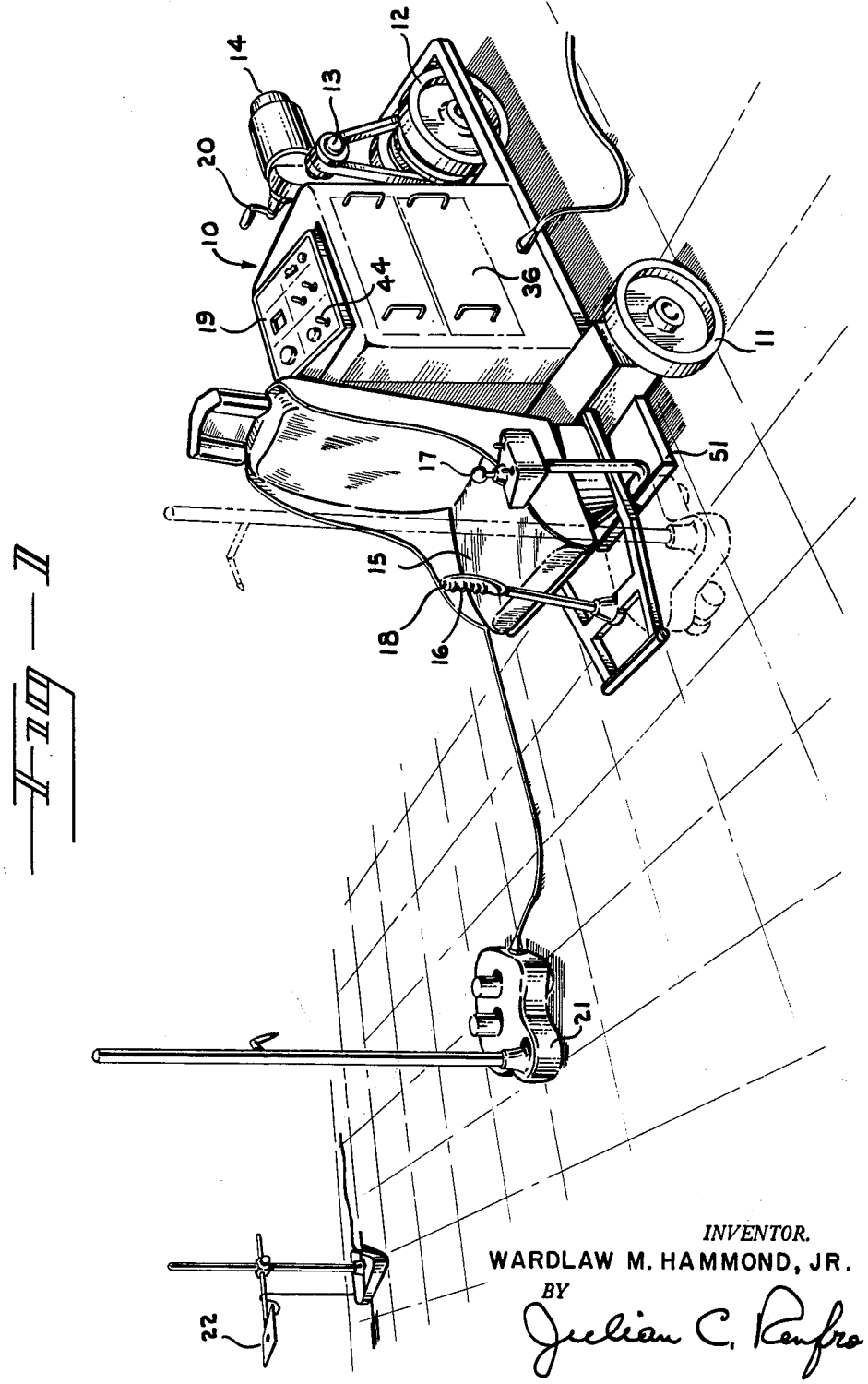
FIGURE 1 is a perspective view illustrating in some detail the aircraft simulator, upon which the operator is seated, and the missile simulator, these being shown in relationship to a fixed target, and mounted upon a common surface.

In FIGURE 1 the aircraft simulator 10 is illustrated as being a wheeled vehicle having front wheels 11 and driving wheels 12. Wheels 12 are driven in rotation by a suitable drive mechanism 13 utilizing an electric motor 14 or the like to furnish propulsive effort. The operator is seated in pilot's seat 15 and proceeds to grasp the pilot's stick 16 with his right hand and missile control stick 17 with his left hand. A launch switch in the nature of a trigger or thumb button 18 on the upper portion of the pilot's stick 16 is the only operating portion of the pilot's stick.

An instructor's panel 19, mounted on computer 36, is provided behind the pilot's seat, and on this panel may be located suitable controls for enabling inputs such as aircraft speed, dive angle, aircraft altitude and other parameters which influence missile flight to be preset into the computer. I preferably employ a speed control in the nature of a variable speed drive mechanism manipulated by a crank 20, which enables the speed of simulated aircraft vehicle 10 to be adjusted over a range which is appropriate for the simulated speed of the aircraft for a given tactical situation.

The missile simulator is in the form of an electrically propelled wheeled vehicle 21, which, through the operator's efforts, is guided to target 22. Missile simulator 21 preferably has three wheels, the front wheel 23a of which as shown in FIGURE 3, is driven by a servo 23 which propels the vehicle along a simulated ground track at a rate corresponding to missile ground track velocity. A velocity type servo is preferred for this purpose, wherein the motor shaft rotational speed is caused to be proportional to an input velocity representing ground track velocity.

Servo 23 consists of an electric motor, a rate indicator (tachometer), a gear train and an amplifier as is typical of a rate or velocity servo. When the servo motors are not being energized, such as when the stop switch is thrown, they will turn free and the mechanisms may be turned manually. This is necessary for reset purposes, and to allow vehicle 21 to be propelled by the aircraft simulator before the launch switch is depressed to energize the motors.

Servo 24 is employed to steer the vehicle 21, and simulates the missile steering control surface position. Device 24 is a position type servo which is operated by the right-left outputs of the missile operator's control stick 17. For a preferred type of missile guidance control, the angular position of the missile steering control surface will be proportional to the right-left angular position of the stick 17, and thus the angular position of the axis of the steering spindle 25 will be proportional to the angular position of the control stick 17.

Also located upon vehicle 21 is a column 26 upon which missile simulator staff 27 is vertically movable. A point source of light 28 is located upon the extreme tip of staff 27, and this vertically movable sighting point means serves as the pilot's reference to the simulated position of the missile flare when attempting to guide the missile to the illuminated target disc 29 located on fixed target 22.

A servo 31 serves to drive the vertically-traveling simulated missile staff 27 to represent the missile's altitude changes. This servo is similar to the earlier described servo 23. As will be discussed at greater length hereinafter, the input to servo 31 is vertical speed of the missile and emanates from a computer which converts up-down commands from the missile control stick into missile movements. This may be accomplished by using a flagpole type arrangement in which a cord or cable 32 is driven from a pulley wheel 33 mounted upon the output shaft of servo 31, this cable passing over upper and lower pulleys 34 and 35 and directly connected to move staff 27 up or down the column 26 depending upon the direction of rotation of pulley wheel 33.

The missile operator's control stick 17 involves two potentiometers to supply voltages proportional to the control stick position angle in up-down and right-left coordinates. The stick is directly connected to each potentiometer by an appropriate linkage to provide for the two degrees of freedom, such that motion in each degree of freedom of the control stick is transferred to the appropriate potentiometer. Note FIGURE 4 illustrating a double yoke arrangement employed so that the potentiometers may be selectively and individually operated as required.

Computer 36 is located on simulated aircraft vehicle 10 behind the pilot's seat, and for approximate solutions of a missile guidance problem, the computer can employ a programmer which prescribes the ground track velocity of the missile simulator vehicle 21. This programmer preferably supplies a varying voltage to servo 23 representative of the ground track velocity of a typical missile throughout its flight, and as will be noted in FIGURE 4, this voltage is obtained from a motor-operated cam-driven potentiometer 37 which is in turn connected to a D.C. voltage source. Motor 38 is geared so as to drive cam 39 at a speed proportional to time elapsed from the start of the simulated launch, and may result in the potentiometer being driven by cam follower 41 in either the voltage increasing or the voltage decreasing directions, depending upon the velocity characteristics of the missile being simulated. However, in each instance an entire revolution of the cam requires approximately the same interval of time as is required for the missile simulator to leave the aircraft simulator and then travel to the target. The programmer is started and reset by the launch switch 18 and its output is fed to the servo 23 to vary its speed as directed by the program.

An integrator is to be employed in the computer to transform up-down proportional voltages from the missile operator's control stick to proportional velocity data which in turn is converted to proportional position acceleration by the rate motor 31 on the missile simulator vehicle 21, as will hereinafter be described in greater detail.

In the event that a more rigorous solution for the missile flight motion is desired, all of the inputs to the missile simulator 21 may be computer-derived. This computer would program the missile velocity along its flight path in a similar manner as previously described and derive for a given dive angle, the ground track velocity, which is fed in the form of control voltages to servo 23. The computer would also convert the missile left-right steering commands from the control stick 17 to signals proportional to rate of turn, appropriately modified to consider the changing missile velocity as aforementioned, with its resultant effect on rate of turn or maneuver capability, and would supply electrical voltages proportional to this rate of turn quantity to servo 24. A third input is to the servo 31, this input being vertical speed of the missile, and is derived from the up-down control voltages from the missile operator's control stick through the use of an integrator and a function unit in the computer which modifies the input to the integrator to provide for the changing maneuver factor of the missile which in turn is caused by the changing missile velocity aforementioned. Other missile characteristics which influence flight performance such as missile control system lag, etc., may also be supplied by the computer. The use of commercial analogue computers to perform the above functions is well-known in the simulation art and does not need expatiation here.

Figure 2:
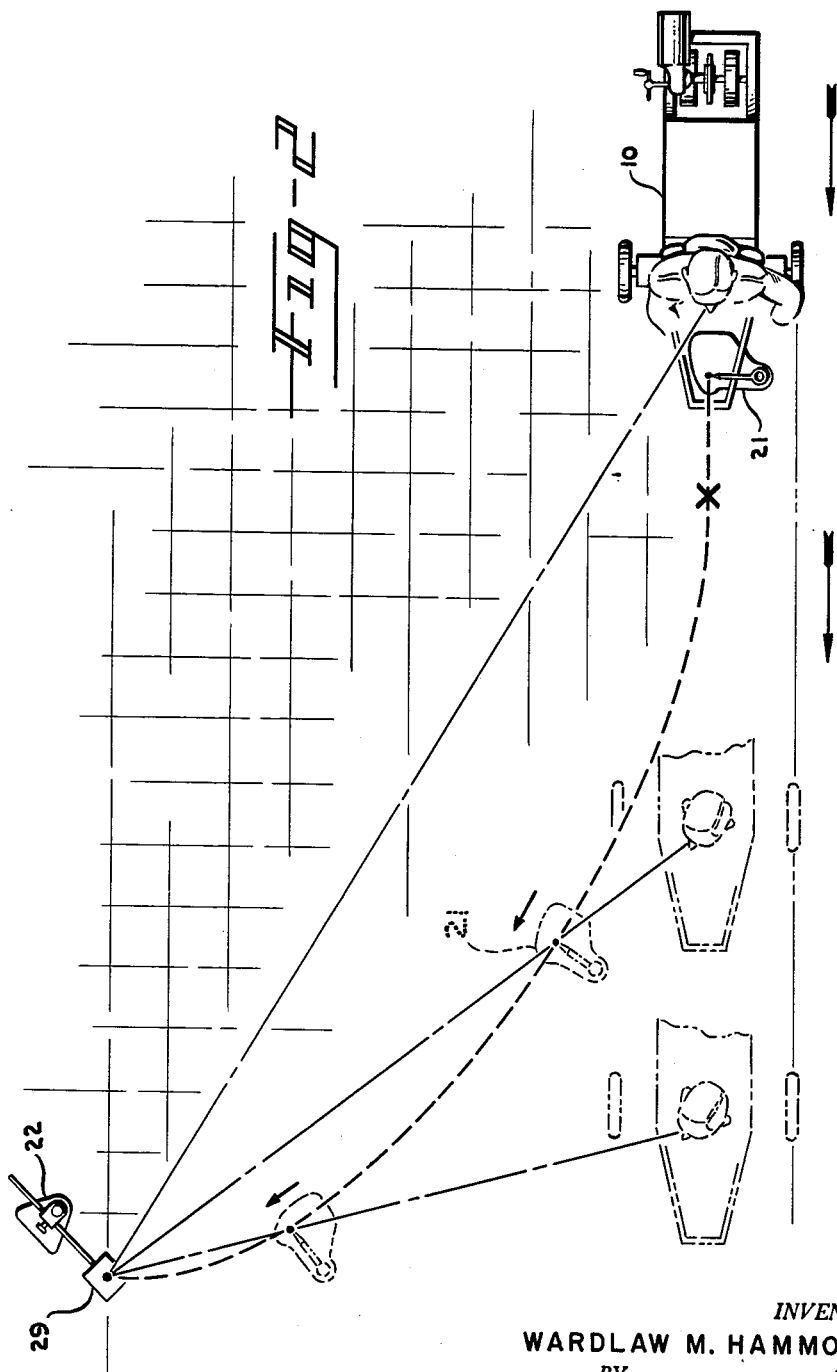
FIGURE 2 is a plan view illustrating typical progressive relationships between the aircraft simulator and the missile simulator as latter is directed toward the fixed target in accordance with a typical tactical maneuver.

Referring now to FIGURE 2, this plan view illustrates the appropriate relationships between the missile simulator, the launching aircraft and the fixed target for a launch tactic in which the target is offset from the path of the simulated aircraft vehicle 10. Missile simulator 21 is for the moment located below the missile operator's chair, and is placed such that the sighting point means 28 on the simulated missile staff 27 is in alignment with the central line of the missile operator's control vehicle, in the horizontal plane, and elevated to eye level. A push bar 51, illustrated in FIGURE 1, is provided on the front of the vehicle 10 so as to contact properly the vehicle 21 during the initial phase of the launching procedure, and to carry vehicle 21 along with vehicle 10. Then, after launch, because of the greater speed of the missile, the vehicle 21 outdistances the aircraft simulator 10 and is then directed toward the target as a function of the skill of the operator.

In order to launch the missile, the pilot presses the launch button 18 at which point the missile simulator 21 moves ahead of vehicle 10, simulating the launch of the missile from the aircraft. The pilot then endeavors to steer the sighting point means 28 on the missile simulator staff 27 in alignment with his line of sight to target 29 by means of manipulation of control stick 17. Reduced illumination conditions are employed in the room so that the operator will follow light 28 and not be distracted by movements of vehicle 21. As an example of the operation, if the point of light 28 appears to the missile control operator to be to the left and below his line of sight to target 29, he will move control 17 to the up-right position and hold the stick in this position until he observes corrective movement of sighting point means 28 taking place. As point of light 28 approaches his line of sight to illuminated target 29, some opposite inputs from control 17 are required to prevent overshoot of point of light 28 and to steady the point of light on to his line of sight. The missile spot size changes according to natural perspective.

In the relationship shown in FIGURE 2, the three positions of the vehicle 21 are shown to lie on a curved path since this is the only path which will satisfy the conditions coincident with the pilot's line of sight to a target offset from the path of vehicle 10. It is thus clear that continuous steering commands to the right must be applied during a guidance problem of the type illustrated. In the vertical plane, control is more simplified, since the only influence on the missile's vertical position is gravity (which causes missile drop), and this is offset by the operator applying an initial acceleration signal by the control stick 17 as will be discussed hereinafter at greater length.

This procedure of maintaining alignment of point of light 28 with the control operator's line of sight to the target by means of manipulation of control 17 is continued until impact of light 28 with illuminated target 29 is made. At this point, an auxiliary operator (instructor) stops movement of both vehicles by means of the off-on control located on instructor panel 19 and the vehicles are returned to another starting position so that the problem may be repeated.

To now describe certain details of the computer 36, and referring to FIGURE 4, the potentiometers in control stick 17 are preferably connected in a type of bridge circuit along with a bi-polarity voltage source such that a variable output of positive or negative voltages, representative of missile guidance control surface position or vertical acceleration of the missile across line of sight, is achieved when varying the position of each potentiometer. For example, a pair of batteries 56 is connected as illustrated in this figure, with the central terminal between these batteries being grounded, thereby providing a positive voltage at one pair of ends of these potentiometer windings, and a negative voltage at the other ends of these windings.

Assuming a fixed deflection in the up direction of the control stick 17 to produce an acceleration command, the wiper arm 54 is moved by its linkage counter clockwise across the up-down winding, thereby picking up a fixed potential which is supplied to an integrating device 57, which integrates this voltage with respect to time. For example, the device 57 may be a Miller integrator. The output of the integrator 57, which is now a constantly changing voltage or velocity signal, is fed to the altitude drive servo 31. This servo is of the rate motor type which integrates the velocity signal output from the aforementioned integrator to produce a vertical position acceleration of the simulated missile.

The characteristics of a typical missile of the type which is simulated by the present device is such that a deflection of the guidance control stick by a given amount will displace the missile control surface a proportional amount and cause the missile to appear to accelerate across the line of sight to a degree proportional to stick deflection as is described in more detail hereinafter. Since two integrators, device 57 and servo 31, are involved between the up-down control stick potentiometer output and the simulated missile position as aforementioned, a given input voltage or acceleration command from the control stick will produce an acceleration of the simulated missile position staff 27 across the line of sight as required.

Similarly, movement of the wiper arm 55 of the right-left potentiometer 53 positions the steering servo 24. Assuming vehicle 21 to be in motion as a result of servo 23 receiving a velocity input signal from the computer, a lateral displacement of the vehicle 21 now takes place. The nature of this mechanism is such that this displacement represents a lateral acceleration of the simulated missile across the line of sight, thus also meeting the requirement aforementioned. For further clarification by way of example, a constant rate of turn of the missile simulator 21, resulting from a fixed deflection of the right-left potentiometer, produces a constant radial acceleration of this vehicle in accordance with the kinematics of curvilinear motion. This is directly analogous to the action of the real missile. This acceleration is normal to the path of vehicle 21 and for small turning angles is essentially directly across the line of sight as can be seen by referring to FIGURE 2.

As was mentioned, the up-down control introduces a proportional acceleration of the simulated missile vertical position. Therefore, the effect of gravity may be introduced into the simulator by inserting an appropriate bias voltage in the up-down control channel equivalent to a 1 g. downward acceleration. Thus, with a bias voltage of the proper value and polarity, if the simulated missile is launched with the up-down control stick in the neutral position the missile will appear to drop in the normal manner as it would in an actual flight when no guidance commands are being delivered to the missile.

In operating my device, the maximum time of flight of the missile is established by the cam-operated ground track velocity programmer. This time will determine the maximum scale distance which the simulated missile can travel; therefore, the flight path shown on FIGURE 2 cannot exceed this scale distance. The target 29 therefore must be placed with respect to some anticipated launch point (X) along the path of vehicle 10 such that the path of vehicle 21 is equal to or less than this maximum distance. Note FIGURE 2. As an example, a typical missile flight time is 15 seconds; the simulated aircraft vehicle would travel typically 8500 scale feet; the simulated missile would travel typically 15,000 feet. A preferred scale for the simulator trainer would be 1 foot equals 1500 feet. A typical simulated altitude for launch would be 6000 feet. Therefore, target 29 would be adjusted to be 4 feet below eye level to represent ground level and would be placed at the start of a problem, preferably 20°–40° off the pilot's line of flight and about 6 to 8 feet laterally disposed from the projected flight path of the simulated aircraft. For altitude variations of the simulated aircraft of 1000 feet or so the ground track velocity of the missile would not change appreciably and one programmer cam for a given missile would in many cases suffice. For variations beyond this value, a new cam 39 could be substituted prior to start of problem.

At the end of a problem at missile impact the instructor opens switch 44 of panel 19, which switch is in series with launch switch 18. This loss of power causes the cam programmer mechanism to reset. This causes the motor to return the cam to the start or pre-launch position, thus providing the correct ground track velocity when next launched. This action is duplicated in commercially available equipment manufactured by the Hayden Company, a well known manufacturer of timing motors. The flagpole can be reset by manually driving the missile staff to the eye level point. The missile simulator vehicle 10 is positioned at the start of a program at the appropriate location manually. The aircraft simulator is equipped with a reversing switch to bring about the reversal of operating direction of A.C. induction motor 14, thereby enabling vehicle 10 to be returned to a desired starting point.

As should be apparent, the aircraft simulator is designed to travel at a steady rate in a straight line path, although its speed can be varied if desired from problem to problem in order to accurately depict the characteristics of the type of launching aircraft utilized. The missile simulator likewise can accurately represent missiles of different speed and flight characteristics.

The electrical cable for supplying intelligence to the missile simulator can either utilize a reeled cable arrangement extending directly thereto from the aircraft simulator, or alternatively a fixed length of cable can be utilized between the vehicles, with an appropriate supporting device used to keep excess cable from interfering with the travel of the missile simulator.

Many variations within the spirit of this invention will be apparent to those skilled in the art, and I am not to be limited to the appended drawings or descriptions except as required by the scope of the appended claims.

I claim:

1. A guided missile training and simulation device using a three-dimensional display arrangement for providing a direct analog of missile movement throughout the simulated flight of the missile comprising a self-propelled carriage operative on a plane surface for carrying a human operator in the general direction of the target for the purpose of simulating the flight path of an aircraft, a self-propelled steerable missile position simulator operative on said plane surface, and a target disposed upon said plane surface, said missile simulator having vertically movable sighting point means for continuously representing the spatial position of the missile depicted by said simulator, said carriage having manually-operated missile control means for guiding said missile position simulator along said surface, a steerable wheel on said missile simulator capable of being turned about a vertically disposed spindle axis in response to steering commands from said missile control means, said sighting point means being mounted above said steering spindle axis and disposed at all times substantially upon the centerline of said axis throughout the range of movements of said sighting point means, said manually-operated missile control means also being effective to direct said sighting point means along the operator's sight line into impact with said target.

2. A guided missile training and simulation device using a three-dimensional display arrangement for providing a direct analogue of missile movement throughout the simulated flight of the missile comprising an aircraft simulator operative on a plane surface for carrying a human operator in the general direction of a target, a self-propelled, steerable missile simulator operative upon said plane surface, and a target disposed upon said plane surface, said missile simulator simulating the launching of a guided missile from an aircraft and the directing of the missile to the target, said missile simulator having vertically movable sighting point means for continuously representing the spatial position of the missile depicted by said simulator, said aircraft simulator having manually-operated missile control means for guiding said missile simulator along said surface, and for directing said sighting point means along the operator's sight line into impact with said target, said missile simulator being first carried along said surface with said aircraft simulator, and upon launch, being directed from said aircraft simulator to said target by manipulation of said missile control means.

3. A guided missile training and simulation device using a three dimensional display arrangement for providing a direct analogue of missile movement throughout the simulated flight of the missile comprising an aircraft simulator operative on a plane surface for carrying a human operator in the general direction of a target, a self-propelled, steerable missile simulator operative upon said plane surface, and a target disposed upon said plane surface, said missile simulator having vertically movable sighting point means for continuously representing the spatial position of the missile depicted by said simulator, said aircraft simulator having manually-operated missile control means for guiding said missile simulator along said surface, and for directing said sighting point means along the operator's sight line into impact with said target, said missile control means being selectively operable to give right-left or up-down commands to said missile simulator to bring about appropriate displacement of said sighting point means with respect to the operator's sight line to said target, said aircraft simulator containing a computer which programs the velocity of said missile simulator over said surface to properly reflect the ground track velocity of the missile represented, and which modifies up-down steering commands to said sighting point means such that operation of said missile control means will effect a position acceleration of said sighting point means dependent on the magnitude of said commands, said missile simulator being steerable to the extent of executing a rate of turn dependent upon the magnitude of the right-left steering commands from said control means.

4. A guided missile training and simulation device using a three dimensional display arrangement for providing a direct analogue of missile movement throughout the simulated flight of the missile comprising an aircraft simulator operative on a plane surface for carrying a human operator in the general direction of a target, a self-propelled, steerable missile simulator operative upon said plane surface, and a target disposed upon said plane surface, said missile simulator having vertically movable sighting point means for continuously representing the spatial position of the missile depicted by said simulator, said aircraft simulator having manually-operated missile control means for guiding said missile simulator along said surface, and for directing said sighting point means along the operator's sight line into impact with said target, said aircraft simulator containing a computer which programs the velocity of said missile simulator representative of the ground track velocity of a missile for various simulated dive angles and launch altitudes preset into the computer, and which modifies the right-left steering commands from said missile control means such that said missile simulator executes a rate of turn dependent upon and varied by the ground track velocity and magnitude of the command at any instant during the missile flight being simulated, and modifies up-down electrical signal commands from said missile control means such that said commands, when applied to the motivating means of said vertically movable sighting point means are representative of the derivative of the rate of change of simulated missile altitude also dependent upon and varied by the instantaneous ground track velocity and the magnitude of the applied command.

5. A guided missile training and simulation device using a three dimensional display arrangement for providing a direct analogue of missile movement throughout the simulated flight of the missile comprising an aircraft simulator operative on a plane surface for carrying a human operator in the general direction of a target, a self-propelled, steerable missile simulator operative upon said plane surface, and a target disposed upon said plane surface, said missile simulator having vertically movable sighting point means for continuously representing the spatial position of the missile depicted by said simulator, steering means located in a forward part of said missile simulator and rotatable about a substantially vertical axis, said sighting point means being disposed substantially in alignment with said axis throughout the range of movement of said sighting point means, said aircraft simulator having manually-operated missile control means for directing said sighting point means along the operator's sight line into impact with said target as a result of guiding the path of said missile simulator along said surface and controlling the vertical position of said sighting point means.

6. The guided missile training and simulation device according to claim 5 in which servo means are employed in said missile simulator, said servo means comprising separate velocity type servos for propelling said missile simulator and vertically moving said sighting point means, and a position type servo for steering said missile simulator over said plane surface.

7. The guided missile training and simulation device according to claim 6 in which said missile control means of said aircraft simulator can be selectively operated to give right-left or up-down commands to appropriate servos of said missile simulator, and in which an integrator is interspersed between said missile control means and said servo means for performing a mathematical integration with respect to time upon up-down command signals directed to said servo concerned with moving said sighting point means.

8. A guided missile training and simulation device using a three dimensional display arrangement for providing a direct analogue of missile movement throughout the simulated flight of the missile comprising an aircraft simulator operative on a plane surface for carrying a human operator in the general direction of a target, a self-propelled, steerable missile simulator operative upon said plane surface and having thereon a vertically-movable sighting point initially disposed approximately at the eye level of the operator, and a target disposed upon said plane surface, into contact with which the operator strives to guide said sighting point means, said aircraft simulator having means for contacting said missile simulator so that said aircraft simulator can push said missile simulator over said surface prior to launch of said missile simulator from said aircraft simulator, said aircraft simulator also having manually-operable missile control means thereon to be used for launching said missile simulator and, after launch, for guiding same toward said target, said missile simulator having a plurality of servo mechanisms thereon for separately performing the functions of self-propulsion and steering of latter simulator, and for positioning said vertically movable sighting point means in response to appropriate manipulation of said missile control means, whereby an operator can guide said sighting point means into impact with said target with an accuracy dependent upon his individual skill.

9. The guided missile training and simulation device as in claim 8 in which said aircraft simulator contains a computer which programs the velocity of said missile simulator representative of the ground track velocity of a missile for various simulated dive angles and launch altitudes preset into the computer, and which modifies the right-left steering commands from said missile control means such that said missile simulator executes a rate of turn dependent upon and varied by the ground track velocity and magnitude of the command at any instant during the missile flight being simulated, and modifies up-down electrical signal commands from said missile control means such that said commands, when applied to the motivating means of said vertically movable sighting point means are representative of the derivative of the rate of change of simulated missile altitude also dependent upon and varied by the instantaneous ground track velocity and the magnitude of the applied command.

10. A guided missile training and simulation device using a three dimensional display arrangement for providing a direct analog of missile movement throughout the simulated flight of the missile to a target, comprising a self-propelled aircraft simulator operative on a plane surface for carrying a human operator in the general direction of a target disposed at a remote location on the surface, a self-propelled steerable missile position simulator capable of being pushed along said surface by said aircraft simulator and then launched toward the target, said aircraft simulator having manually operated missile control means for guiding said missile position simulator along said surface, said missile position simulator having steering means located in a forward part thereof, and having a vertically movable sighting point means movable in substantial alignment with an imaginary vertical axis disposed through said steering means, said sighting point means continuously representing the spatial position of the missile depicted by said missile position simulator, said manually operated missile control means being effective to control the vertical position of said sighting point means, and by virtue of the guidance of said missile simulator along said surface, being effective to direct said sighting point means along said operator's sight line into impact with the target.

References Cited in the file of this patent

UNITED STATES PATENTS

| | | |
|---|---|---|
| 2,316,181 | Ocker et al. | Apr. 13, 1943 |
| 2,584,113 | Butler | Feb. 5, 1952 |